United States Patent [19]
Mansfield et al.

[11] Patent Number: 5,191,632
[45] Date of Patent: Mar. 2, 1993

[54] SPLICE ACTUATOR TOOL

[75] Inventors: Charles M. Mansfield; Raymond J. Kastens, both of Austin; Donald K. Larson, Cedar Park, all of Tex.

[73] Assignee: Minnesota Mining and Manufacturing Company, St. Paul, Minn.

[21] Appl. No.: 763,112

[22] Filed: Sep. 20, 1991

[51] Int. Cl.$^5$ ............................................. G02B 6/38
[52] U.S. Cl. ................................. 385/134; 385/136; 385/137; 385/95
[58] Field of Search ................. 385/134, 136, 137, 97, 385/61, 74, 98, 95

[56] References Cited

U.S. PATENT DOCUMENTS

| | | | |
|---|---|---|---|
| 4,028,162 | 6/1977 | Cherin et al. | 156/158 |
| 4,102,561 | 7/1978 | Hawk et al. | 350/96.21 |
| 4,123,137 | 10/1978 | Marcatili | 350/96.21 |
| 4,911,524 | 3/1990 | Itoh et al. | 385/97 |
| 4,940,307 | 7/1990 | Aberson et al. | 350/96.21 |
| 4,997,255 | 3/1991 | Lukas et al. | 385/95 |
| 5,029,972 | 7/1991 | Lukas et al. | 350/96.21 |
| 5,121,456 | 6/1992 | Essert et al. | 385/134 |

OTHER PUBLICATIONS

"Fibrlok TM Optical Fiber Splicing System" published by Minnesota Mining and Manufacturing Company in Oct. 1990.

Type-51 Mass-Fusion Splicer, Published by Sumitomo Electric having a code indicating printing in Sep. 1990.

Primary Examiner—John D. Lee
Assistant Examiner—S. W. Barns
Attorney, Agent, or Firm—Gary L. Griswold; Walter N. Kirn; Jack V. Musgrove

[57] ABSTRACT

A tool for actuating an optical fiber splice having an actuation element which moves longitudinally within the splice. The tool includes a base having a recess for receiving the splice, and two channels parallel to and aligned with the recess. A pair of fiber holders are used to manipulate the fibers, the holders being placed in the channels. The channels have ramped surfaces inclined toward the recess to facilitate proper insertion of the fibers into the splice, and the ramped surfaces have slots therein allowing passage of push rods which bias the holders toward the splice, providing positive abutment of the fiber end faces within the splice. Backstops are formed at the outside ends of the channels, and sidewalls are formed adjacent the backstops. A lever is pivotally attached to the underside of the base, and has an actuation stud which passes through an opening in the base and contacts the actuation element of the splice. When the lever is moved from an unactuated position to an actuated position, the stud forces the actuation element of the splice to clamp the inserted fibers. Means may be provided to retract the push rods, and a magnifying glass is provided to facilitate visual inspection of the inserted fibers.

20 Claims, 2 Drawing Sheets

SPLICE ACTUATOR TOOL

BACKGROUND OF THE INVENTION

1. Field of the Invention

The present invention generally relates to devices for optically connecting the ends of waveguides such as optical fibers, and more particularly to a tool which is used to actuate an optical fiber splice.

2. Description of the Prior Art

Splice devices for optical fibers are known in the art, but there is still a need for a quick and reliable method of splicing not only discrete fibers, but also a plurality of fibers in a high density environment. The present invention relates not to the splices or connectors per se, but rather to a tool which is used to operatively place fibers in a splice or connector.

Many alternative splice designs exist, and several of these designs require, or are advantageously used with, special assemblies or tools for preparation of the fibers and creation of the splice. For example, an early patent to Cherin et al. U.S. Pat. No. 4,028,162 describes the use of inclined ramps to guide a plurality of fibers in two ribbon cables towards a plastic substrate having fiber-receiving grooves. An embossing head is then used to clamp a cover plate over the grooved substrate. Another tool used in joining multiple fiber ribbons is depicted in U.S. Pat. No. 4,123,137 issued to E. Marcatili, and includes two holders having alignment pegs for the ribbons, one of the holders being slidable along a pair of rods to cause a first ribbon to abut a second ribbon. A grooved cover plate helps align the fibers during curing of a bonding material.

Two assembly tools or jigs for discrete fiber splices are disclosed in U.S. Pat. Nos. 4,940,307 (Aberson et al.) and 5,029,972 (Lukas et al.). The jig of Aberson is fairly simple, essentially only a holder having two arms with slots which receive ribs on the underside of the splice body. The Lukas jig, however, is more complicated. That jig has a slot used to secure a special splice body, and two adjacent fingers which are used to push a gripping member in the body that overlies the splice area. A lever having a roller at the operative end is used to actuate both the fingers and a compression member disposed opposite the fingers with respect to the splice body. When the lever is moved to a first position, the roller indirectly causes the fingers to push the gripping member away from the splice area, easing insertion of the fibers. When the lever is moved to a second position, it forces the compression member against the opposite side of the gripping member, pushing the gripping member toward the fibers and clamping them. The jig also has a pair of slitted foam blocks for supporting the fibers proximate the splice area.

Another device, which is reminiscent of the Lukas jig and, with Lukas, probably represents the closest prior art, is the assembly tool sold by Minnesota Mining and Manufacturing Company (3M, assignee of the present invention) which is in conjunction with the FIBRLOK optical fiber splice (FIBRLOK is a trademark of 3M. That tool has a cradle area for receiving the FIBRLOK splice body, and foam retention pads adjacent the splice area for supporting the fibers. A lever pivots over and onto the upper surface of the cradled splice body; the lever has a compression surface which forcibly contacts the cap of the FIBRLOK, and snaps it into an actuated position.

While the foregoing tools are particularly useful with their corresponding splice designs, none of these tools are designed for use with a mechanical splice requiring longitudinal movement of an actuation element. Specifically, none of these tools may be used in conjunction with the $MF^2$ multiple fiber splice ($MF^2$ is also a trademark of 3M) which is disclosed in U.S. Pat. No. 5,151,964 (this application is not prior art). It would, therefore, be desirable and advantageous to devise a splice assembly tool which may provide longitudinal actuation of a mechanical splice. The tool should preferably facilitate visual confirmation that the fibers have been properly aligned with the splice prior to insertion of the fibers into the splice, and further provide positive abutment of fibers which are inserted into the splice to minimize signal loss across the splice.

SUMMARY OF THE INVENTION

The foregoing objectives are achieved in a splice actuator tool comprising a base having a recess for receiving the splice, and a lever coupled to the base, the lever having an actuation stud which contacts the actuation element of the optical fiber splice and causes the actuation element to slide longitudinally (parallel with the splice-receiving recess), mechanically securing the abutting fiber ends within the splice. When used with a multiple fiber splice, a pair of holders are provided to facilitate manipulation of the fiber ribbons. The holders are laid in channels to properly align the ribbons with the splice. Biasing means are also provided for the holders to keep the ribbons in positive abutment. Viewing means, such as a movable magnifying lens, is advantageously provided over the splice area to allow visual inspection of the fiber insertion.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1A:
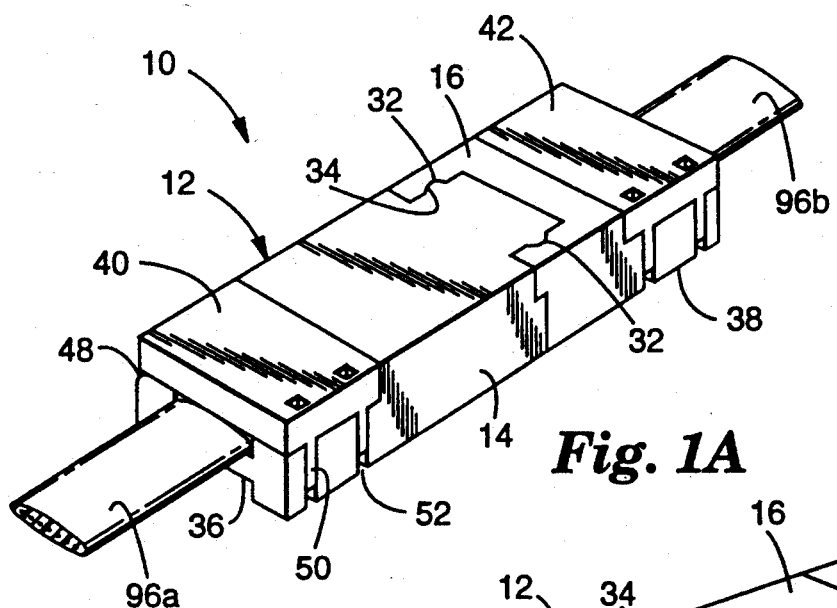
FIG. 1A is a perspective view of a specific multiple fiber splice which may be actuated with the tool of the present invention.
Figure 1B:
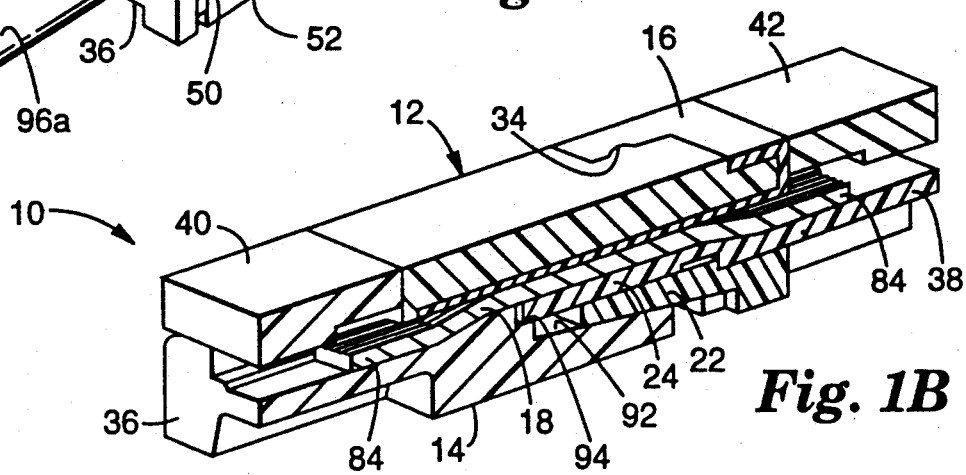
FIG. 1B is a perspective view of the same splice shown in cross-section.

The present invention comprises a tool for actuating a mechanical splice for connecting optical fibers. Prior to describing the tool, however, it is beneficial to discuss an exemplary splice which may be actuated with the tool. Such a splice is illustrated in FIGS. 1A and 1B, and is described in greater detail in U.S. patent application Ser. No. 07/753,332, filed Aug. 29, 1991. The reference numerals used here to describe the splice are the same as used in that application.

With reference to FIG. 1A, multiple fiber splice 10 generally comprises a splice body 12, including a jacket 14 and a cap 16, and a splice element 18. A snap fit may be provided between jacket 14 and cap 16 by protrusions or bumps 32 on the end of jacket 14 which fit into recesses 34 in cap 16. Splice body 12 also has extensions 36 and 38 which facilitate insertion of fiber ribbons 96a and 96b. End covers 40 and 42 are provided for extensions 36 and 38, respectively. The end covers may include latches 50 which catch on notches 52 in the extensions.

With further reference to FIG. 1B, it can be seen that splice element 18 lies within a slot in jacket 14. Splice element 18 is formed from a sheet of ductile material which is embossed with a plurality of fiber-receiving V-grooves and a fold line forming a hinge. In this manner, the fibers to be spliced may be inserted between the plates formed by hinged splice element 18, and clamped within the V-grooves. Splice element 18 also has porches 84 which extend beyond the slot in jacket 14. Porches 84 have a plurality of lead-in V-grooves which are aligned with the fiber-receiving V-grooves of element 18.

Splice element 18 is actuated (i.e., the plates thereof are clamped together) by means of a wedge 22 which is disposed along a ramp 92 formed in jacket 14. As wedge 22 is moved longitudinally from the unactuated to the actuated position, it forcibly contacts a tongue 24 which is interposed between wedge 22 and splice element 18. Tongue 24, which is supported at its distal end by a shelf 94 formed in jacket 14, then applies a clamping force to splice element 18, thereby securing the fibers.

Although the term "connector" may be applied to splice 10, that term is usually reserved for devices which are intended to provide easy connection and disconnection, as opposed to a splice which is usually considered permanent. Nevertheless, the term "splice" should not be construed in a limiting sense as regards the actuator tool of the present invention. Also, those skilled in the art will appreciate first that the particular splice of FIGS. 1A and 1B may be actuated without the tool of the present invention and, secondly, that the tool as described below can easily be modified in order to actuate other types of splices which require longitudinal movement of the actuation element. The foregoing description of splice 10 should not, therefore, be construed in a limiting sense.

Figure 2:
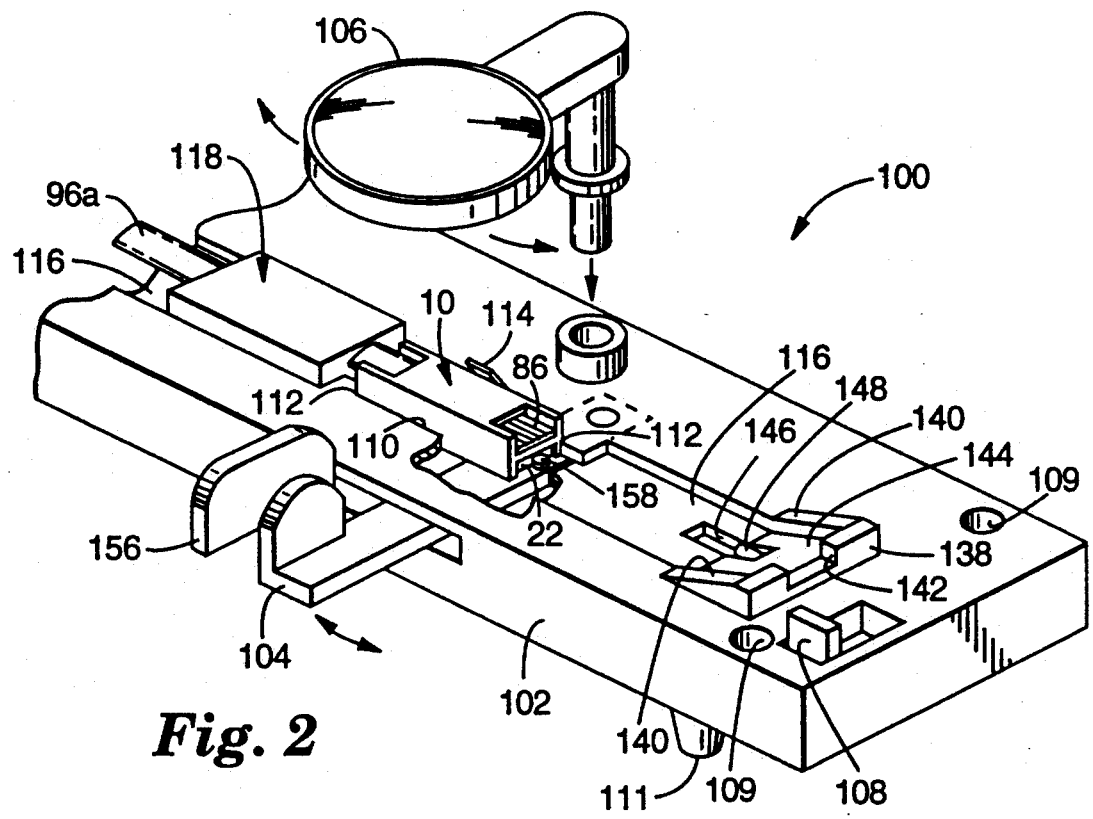
FIG. 2 is a perspective view of one embodiment of the splice actuator tool of the present invention.

Referring now to FIG. 2, the splice actuator tool 100 of the present invention is generally comprised of a base 102, an actuation lever 104, a viewer 106, and a bias release switch 108. Base 102 includes a nest or recess 110 for receiving splice 10. The nest could be formed by an insert piece which adapts to different sizes and shapes of splices. Recess 110 includes sidestops forming corners 112 to keep splice 10 properly located. A metallic prong 114 may also be used to keep splice 10 seated and snugly positioned in recess 110. Holes 109 are provided in base 102 for mounting other accessories, an rubber feet 111 are attached to the bottom of base 102.

Figure 3:
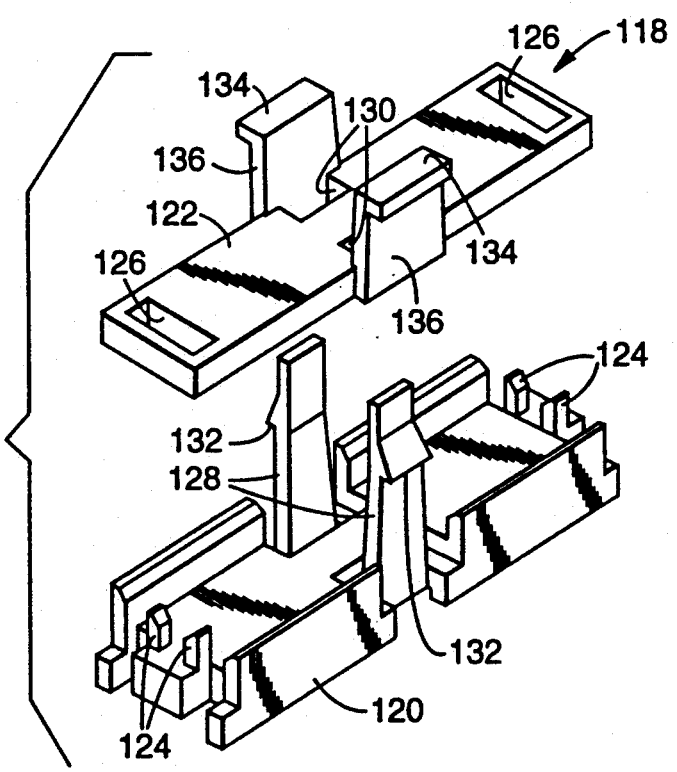
FIG. 3 is an exploded perspective view of the preferred fiber ribbon holder which may be used with the present invention.

Recess 110 is aligned with track means in the form of two channels 116 for receiving a pair of fiber ribbon holders 118, which simplify handling of fiber ribbons, as well as the entire splicing operation. The preferred embodiment of the holder is depicted in FIG. 3. Each holder 118 includes a base 120 and a cover 122 which are both symmetrical to eliminate user error. The inner surface of cover 122 has an elastomeric or foam pad (not visible in the figures) for gently clamping the ribbon. The pad is attached to the inner surface of cover 122 by any convenient means, such as adhesive. The pad allows some slippage of the fiber ribbon which helps to set a proper cleave length during the cleaving operation. Base 120 has ribbon locating prongs 124 which are preferably created by insert molding; this allows interchangeable inserts for different prong sizes which accommodate different ribbon sizes (different bases could be color-coded for different ribbon geometries). Ribbon locating prongs 124 extend through slots 126 in cover 122. Base 120 also has a pair of retaining clips 128 which pass through slots 130 in cover 122. Clips 128 secure cover 122 to base 120, and also provide handles for gripping holder 118. Clips 128 includes catches 132 which snap over flanges 134 of upwardly-extending arms 136 of cover 122. Although holders 118 are preferably used in the cleaving operation, the fiber ribbon must also be stripped and cleaned, and this is preferably accomplished with manual handling of the ribbons, but can also be accomplished with a ribbon already in the holder, provided the stripping device is compatible with the holder. After cleaving, the fiber ends should be inspected to ensure that the cleaves are acceptable.

Channels 116 in base 102 keep holders 118 properly positioned with respect to splice 10, and are sliqhtly deeper than recess 110 to provide proper vertical positioning of the fibers with respect to porch 84 of splice element 18. Means may be provided to keep the holders in the channels, such as retractable fingers (not shown) which are pivotally attached to base 102 and biased downwardly into the channels. Channels 116 have rear backstops 138 and adjacent sidewalls 140 which stabilize holders 118 during fiber insertion. Backstops 138 have a cutout 142 for accommodating the fiber ribbon. Channels 116 also have ramped surfaces 144 which incline holders 118 downward toward splice 10, forcing the exposed fibers to lay flush against porches 84 of splice 10, and further facilitating insertion of the fibers into splice 10 and alignment of the fibers with the lead-in grooves 86. Viewer 106, a magnifying glass having a magnification in the range of 2X to 10X, and preferably about 4X, is movably mounted on base 102 and may be used to visually confirm proper positioning of the fibers in lead-in grooves 86. Viewer 106 is preferably removable to allow easier storage and shipping of tool 100.

Figure 4:
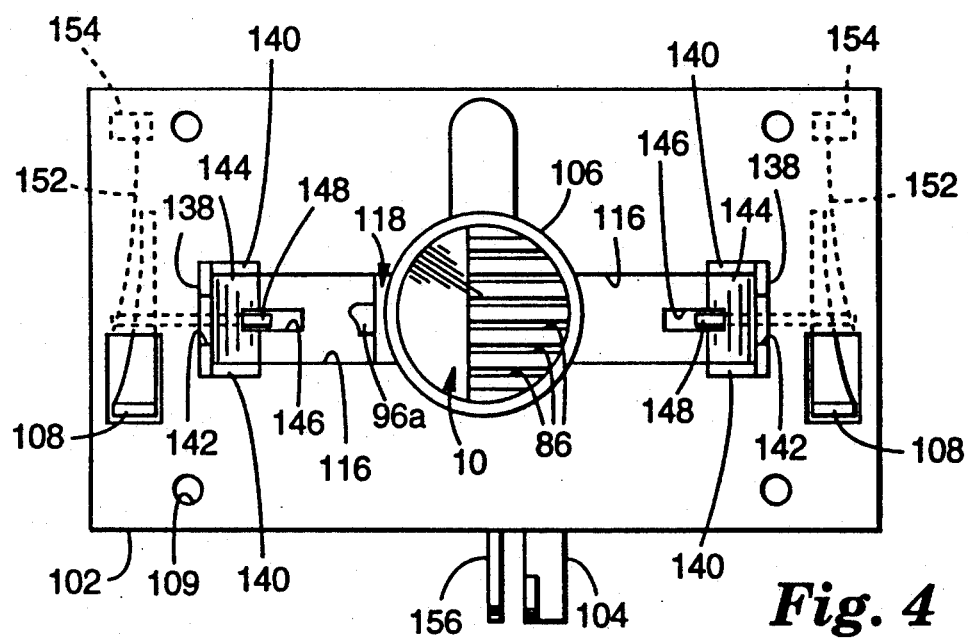
FIG. 4 is a top plan view of the splice actuator tool shown in FIG. 2.

As more clearly shown in the plan view of FIG. 4, a slot 146 is provided in each of the ramps 144 which allows push rods 148 to contact holders 118 (when they are moved toward splice 10, off ramps 144). The terminal end of each push rod 148 has a hole through which passes a wire spring 152. Wire springs 152 are in turn fixed to base 102 by mounting blocks 154. In this manner, push rods 148 bias holders 118 toward splice 10, ensuring positive abutment of the fiber end faces within splice element 118. Push rods 148 should be retracted by pushing release switches 108 forward prior to placement of holders 18 in channels Each release switch 108 contacts a bent portion of one wire spring 152.

After the fibers have been inserted into splice 10 and are in positive abutment, wedge 22 may be actuated by moving lever 104 to the side. A gripping plate 156 may be provided opposite the end of lever 106 to facilitate movement thereof. Lever 106 is pivotally attached to the underside of base 102, and has an actuation stud 158 thereon which is located at one end of recess 110. Base 102 has an opening therein at this end of recess 110 through which stud 158 passes. Thus, when lever 106 is moved toward gripping plate 156, stud 158 forcibly contacts wedge 22, and actuates the splice, clamping the fibers between the plates of splice element 18.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention, including the use of alternative means to provide the longitudinal movement of actuation stud 158 against wedge 22. It is therefore contemplated that such modifications can be made without departing from the spirit or scope of the present invention as defined in the appended claims.

We claim:

1. An apparatus for actuating an optical fiber splice having an actuation element which moves longitudinally within the splice, the apparatus comprising:
a base having a recess therein for receiving the splice; and
means for forcibly contacting the actuation element of the splice, said contacting means providing sliding movement of the actuation element parallel with said recess in said base.

2. The apparatus of claim 1 wherein said contacting means includes a lever which is pivotally mounted to said base.

3. The apparatus of claim 2 wherein:
said base has an opening therein proximate said recess;
said lever extends along a surface of said base opposite said recess; and
said lever has an actuation stud attached thereto, said actuation stud passing through said opening in said base.

4. The apparatus of claim 1 further comprising means for holding fibers to be spliced.

5. The apparatus of claim 4 further comprising means for biasing said holding means towards said recess in said base.

6. The apparatus of claim 5 further comprising track means for aligning said holding means with said recess in said base.

7. The apparatus of claim 6 wherein:
said holding means includes a holder having a base and a cover;
said track means includes a channel for receiving said holder; and
said biasing means includes a push rod located in said channel, said push rod forcibly abutting said holder when said holder is placed in said channel.

8. The apparatus of claim 7 wherein said channel has a first end proximate said recess, and a second end remote from said recess, said second end of said channel having a ramped surface inclined toward said recess.

9. The apparatus of claim 7 further comprising means for retracting said push rod.

10. The apparatus of claim 4 further comprising track means for aligning said holding means with said recess in said base.

11. The apparatus of claim 1 further comprising means for visually magnifying an area surrounding said recess in said base.

12. The apparatus of claim 11 wherein said viewing means comprises a magnifying glass.

13. The apparatus of claim 12 wherein said magnifying glass is removably attached to said base.

14. The apparatus of claim 1 further comprising prong means for keeping the splice seated in said recess.

15. A splice actuator tool for actuating an optical fiber splice having an actuation element which moves longitudinally within the splice, the apparatus comprising:
a base having upper and lower surfaces, a central recess in said upper surface, an opening in said recess, and first and second channels in said upper surface, each of said channels being parallel to and aligned with said recess, said first channel being adjacent a first end of said recess, and said second channel being adjacent a second end of said recess;
a lever pivotally attached to said lower surface of said base, having a stud member passing through said opening in said base, said stud member moving essentially parallel to said recess when said lever is pivoted.

16. The tool of claim 15 further comprising a magnifying glass movably attached to said base, proximate said recess.

17. The tool of claim 15 further comprising first and second means for holding one or more fibers to be spliced, said first and second holding means located in said first and second channels, respectively.

18. The tool of claim 17 wherein said first and second channels each have a first end, proximate said recess, and a second end, remote from said recess, and each of said second ends of said channels having a ramped surface inclined toward said recess.

19. The tool of claim 18 wherein said base also has first and second slots, in said ramped surfaces of said first and second channels, respectively, and further comprising:
a first push rod located in said first slot, for contacting said first holding means;
a second push rod located in said second slot, for contacting said second holding means;
first means for biasing said first push rod toward said recess; and
second means for biasing said second push rod toward said recess.

20. A tool assembly for actuating a multiple fiber splice having a wedge element which slides longitudinally within the splice, the assembly comprising:
a base having upper and lower surfaces, a central recess in said upper surface for receiving the splice, an opening proximate said recess, and first and second channels in said upper surface, each of said channels being parallel to and aligned with said recess, said first channel being adjacent a first end of said recess, and said second channel being adjacent a second end of said recess, each of said first and second channels further having a first end proximate said recess and a second end remote from said recess, each of said second ends of said channels having a ramped surface inclined toward said recess, and further having sidewalls and backstops at said second ends thereof, said base further having first and second slots in said ramped surfaces of said first and second channels, respectively, said slots being parallel with said channels;
prong means for keeping the splice seated in said recess;
a lever pivotally attached to said lower surface of said base, having a stud member passing through said opening in said base for forcibly contacting the wedge element of the splice;
first and second means for holding first and second pluralities of fibers to be spliced, said first and second holding means located in said first and second channels, respectively;
a first push rod located in said first slot, for contacting said first holding means;

a second push rod located in said second slot, for contacting said second holding means;
first means for biasing said first push rod toward said recess;
second means for biasing said second push rod toward said recess;
first means for retracting said to allow placement of said first holding means in said first channel; and
second means for retracting said second push rod to allow placement of said second holding means in said second channel.

* * * * *